US006896224B1

(12) United States Patent
Goodwin

(10) Patent No.: US 6,896,224 B1
(45) Date of Patent: May 24, 2005

(54) APPARATUS AND METHOD FOR MITIGATING TOE STRIKE IN AIRCRAFT

(75) Inventor: John L. Goodwin, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/807,577

(22) Filed: Mar. 18, 2004

(51) Int. Cl.[7] .................................................. B64C 1/10
(52) U.S. Cl. ............ 244/121; 244/122 A; 244/122 AG; 280/732 B
(58) Field of Search ............................ 244/122 A, 121, 244/122 AG; 280/732

(56) References Cited

U.S. PATENT DOCUMENTS

| 4,508,294 A | 4/1985 | Lorch .......................... 244/122 |
| 5,547,149 A | 8/1996 | Kalberer et al. ............. 244/121 |
| 5,558,300 A | 9/1996 | Kalberer et al. ............. 244/121 |
| 5,692,710 A | * 12/1997 | Gee, Sr. ................... 244/118.5 |
| 6,422,512 B1 | 7/2002 | Lewis et al. ................. 244/121 |
| 6,471,242 B2 | * 10/2002 | Schneider ................... 280/732 |

* cited by examiner

Primary Examiner—J. Woodrow Eldred
(74) Attorney, Agent, or Firm—Fredric Zimmerman

(57) ABSTRACT

A method for mitigating toe strike in a cockpit of an aircraft includes providing an airbag module attached to an instrument console located in the cockpit of the aircraft; releasing an airbag from the airbag module after an ejection sequence begins; using the airbag to protect a pilot's lower limbs from striking the instrument console as the pilot begins ejecting.

11 Claims, 5 Drawing Sheets

APPARATUS AND METHOD FOR MITIGATING TOE STRIKE IN AIRCRAFT

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to aircraft pilot ejection safety devices and in particular to a safety device for mitigating toe strike during pilot ejection from an aircraft.

Both small and large aircraft pilots place their legs within the narrow foot well (or foot wells) of an aircraft cockpit to reach the rudder pedals. The foot well is generally defined by the instrument panel and the floor of the aircraft. During the ejection process, as the legs are withdrawn upward through the foot wells, it is possible for the feet and toes to strike the top of the foot well and instrument console. This condition is commonly known as "toe strike" and can lead to serious injury.

Although the acceleration forces of ejection do help pull the legs down, the rapid rise of the seat, an occupant's leg size and the confines of the cockpit, particularly the foot well, can work against clearing the feet from the instrument console. The Air Force and Navy have developed a set of anthropometrical cases to describe the range of the aircrew population, see Table 1 below.

In such a case an airbag system in accordance with the present invention can mitigate the toe strike damage by 1) receiving its initiation signal from the initiation sequencing system; 2) initiating its gas generator; 3) deploying from its frangible container; 4) deflecting the occupant's limb, particularly the lower leg, and particularly the foot and toes, as the ejection seat (which has also been previously been initiated) rises from the cockpit; and 5) collapsing harmlessly out of the escape path for the remainder of the ejection sequence.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

TABLE 1

| Joint DOD Anthropometric Cases (partial listing of attributes) | | | | | | | | |
|---|---|---|---|---|---|---|---|---|
| Feature | Case 1 Small | Case 2 Medium Build Short Limbs | Case 3 Medium Build Long Limbs | Case 4 Tall Sitting Height Short Limbs | Case 5 Overall Large | Case 6 Longest Limbs | Case 7 Overall Small | Case 8 Largest Torso |
| Buttock-knee length | 21.3 | 21.3 | 26.5 | 22.7 | 27.4 | 27.9 | 20.8 | 25.4 |
| Knee-height sitting | 18.7 | 19.1 | 23.3 | 20.6 | 24.7 | 24.8 | 18.1 | 23.2 |
| Thigh circumference range | 18.5–25.0 | 17.1–25.0 | 20.2–27.6 | 17.6–26.3 | 18.6–29.2 | 19.1–29.7 | 17.8–25.2 | 18.6–29.1 |
| Boot Size | | | | 5–13 | | | | |

In Case 6 of Table 1, the geometry of combining a long buttock-knee and tibia (knee-height sitting) results in the knee being farther forward than in any other case. The larger thigh circumference can create a large thigh tangent angle, a space between the ejection seat and the bottom of the thigh that must be made up during the ejection process. As a result, the ejection seat can be in a slightly higher position after it fully supports the thigh. Therefore, the larger tibia is confined, takes longer to clear the same area compared to other cases, thereby resulting in the foot injury.

This type of foot injury may also occur with combinations of Table 1 Features and other human factors not defined in Table 1, in combination with ejection seat height adjustment prior to ejection. Other factors relating to the construction of the aircraft, including but not limited to the cockpit and placement of the ejection seat within the cockpit, can also affect the likelihood of injury.

Figures 5A, 5B:
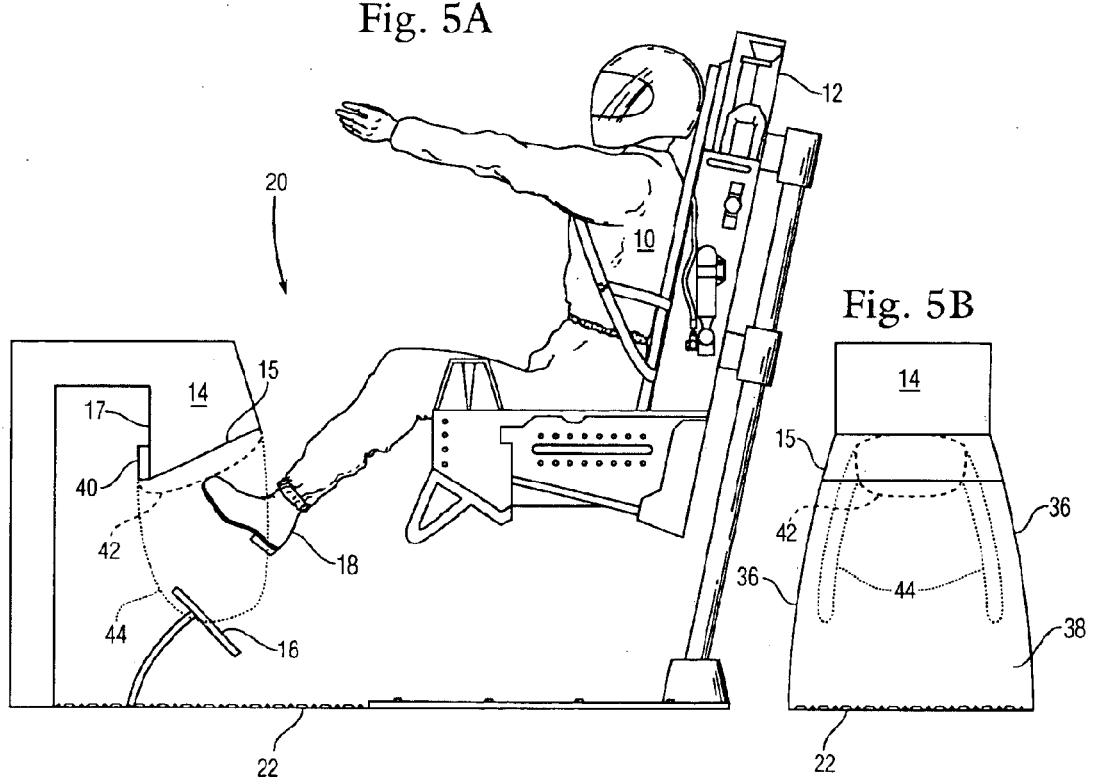

FIG. 5A is a schematic side view of a third embodiment of the invention.

FIG. 5B is a schematic front view of the embodiment of FIG. 5A.

DETAILED DESCRIPTION OF THE PREFERRED EMBODIMENTS

Figure 1:
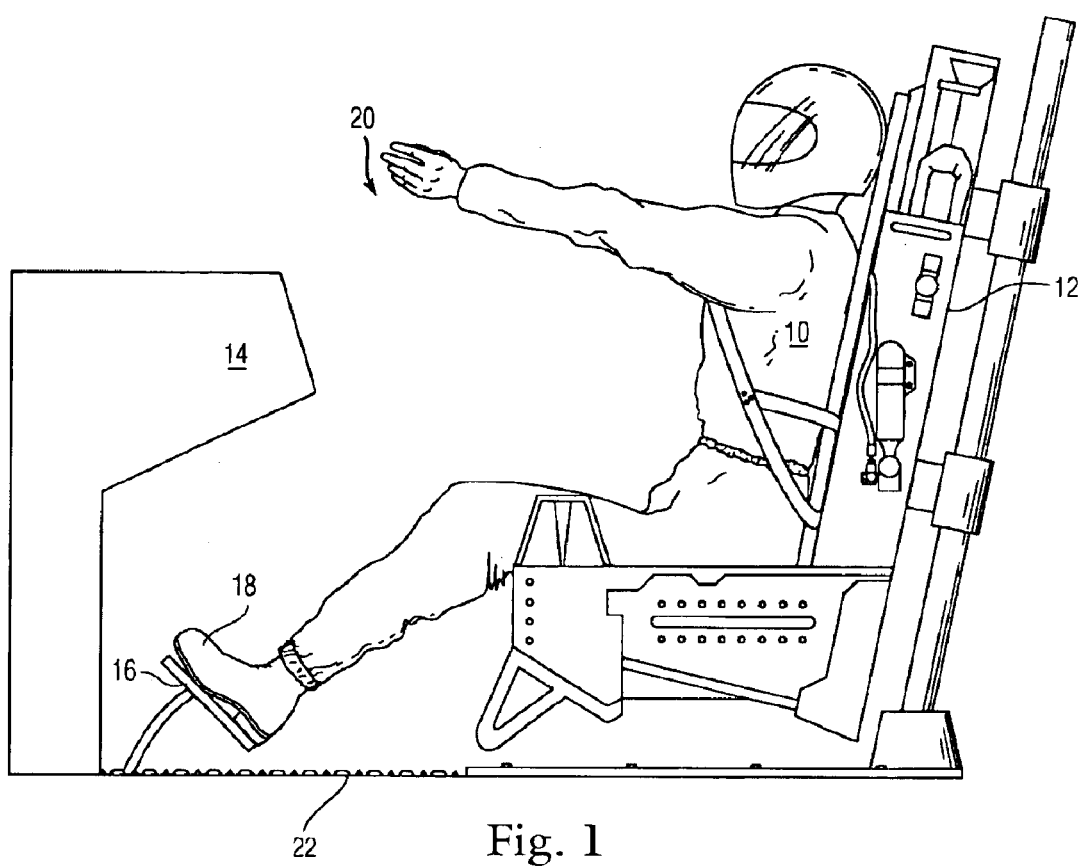
FIG. 1 is a schematic side view of a normally situated pilot in an aircraft cockpit.
Figure 2:
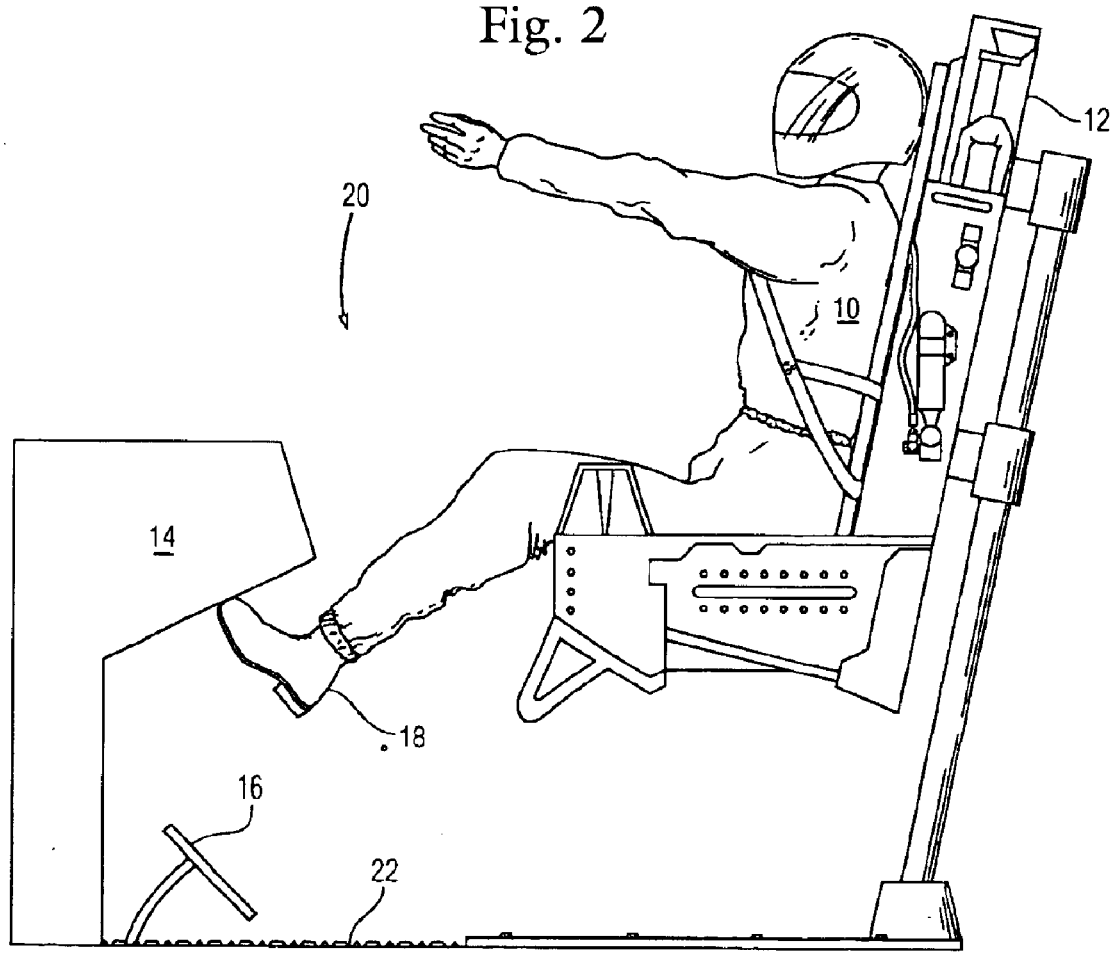
FIG. 2 is a schematic side view of the pilot during ejection.

The invention is an airbag system, implemented in a number of embodiments, to mitigate foot and toe strike hazards arising during aircrew ejection. FIG. 1 is a side view of a normally situated pilot 10 in an aircraft cockpit 20. Cockpit 20 includes a floor 22, an ejection seat 12, instrument console 14 and rudder pedals 16. Pilot 10 has feet 18. FIG. 2 is a side view of the pilot 10 during ejection. In FIG. 2, the feet 18 of pilot 10 strike the console 14, thereby causing possibly serious injury to the pilot's feet and toes.

Figure 3:
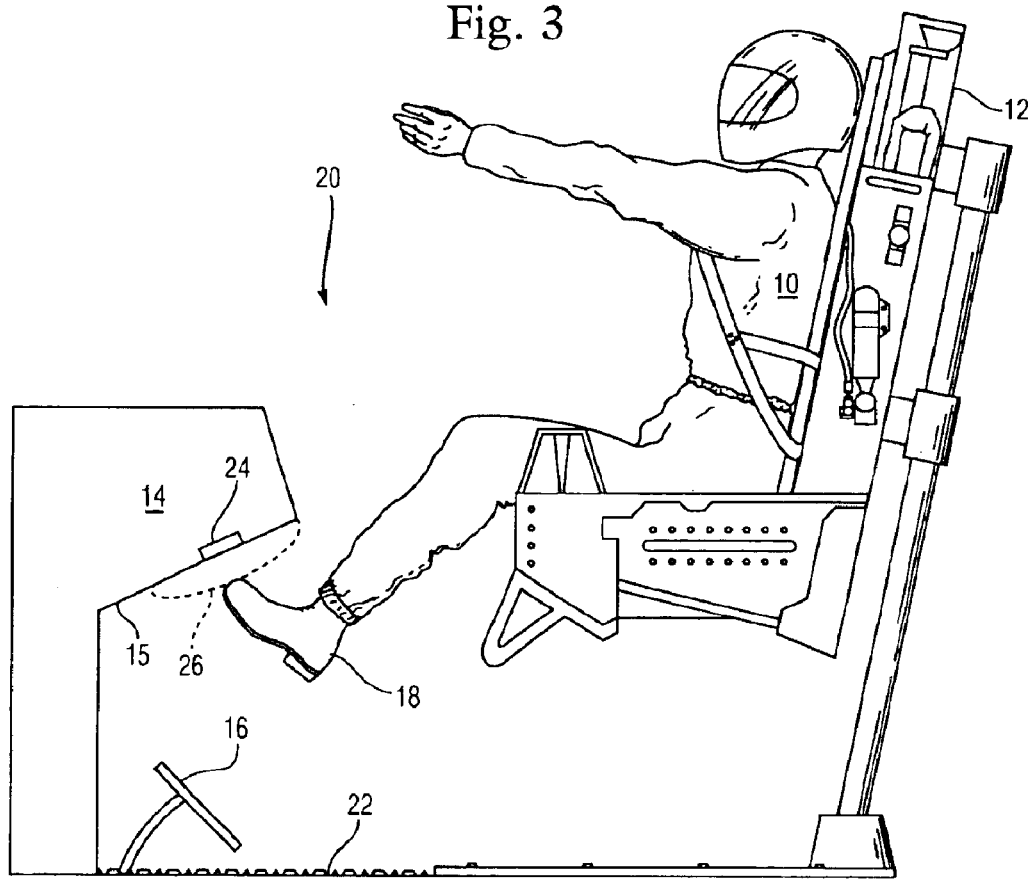
FIG. 3 is a schematic side view of one embodiment of the invention.

FIG. 3 is a side view of one embodiment of the invention. In FIG. 3, an airbag module 24 is flush mounted below the instrument console 14 on a bottom surface 15 thereof. Dashed lines indicate the deployed state of the airbag 26. Airbag 26 is a balloon type airbag, such as the driver and passenger side balloon airbags used in the automotive industry. The airbag module 24 is flush mounted to minimize the risk of creating a new strike hazard in the event the airbag fails to deploy. The airbag 26 deploys after receiving a signal (typically electric, but may be laser, ballistic gas, radio frequency or other forms) from the escape system sequencing system. The airbag 26 is integrated into the escape system sequencing system in a known manner, such as is disclosed in U.S. patent application Ser. No. 10/681,499 filed on Oct. 9, 2003, which is hereby incorporated by reference.

Airbag 26 helps deflect the feet 18 and legs of pilot 10 down and away from the instrument console 14, and also cushions any impact with the console 14. The placement of the flush mounted airbag module 24 is preferably near the front of the console 14, because the size of the inflated airbag 26 must increase as its location moves farther from the front of the instrument console 14.

Figures 4A, 4B:
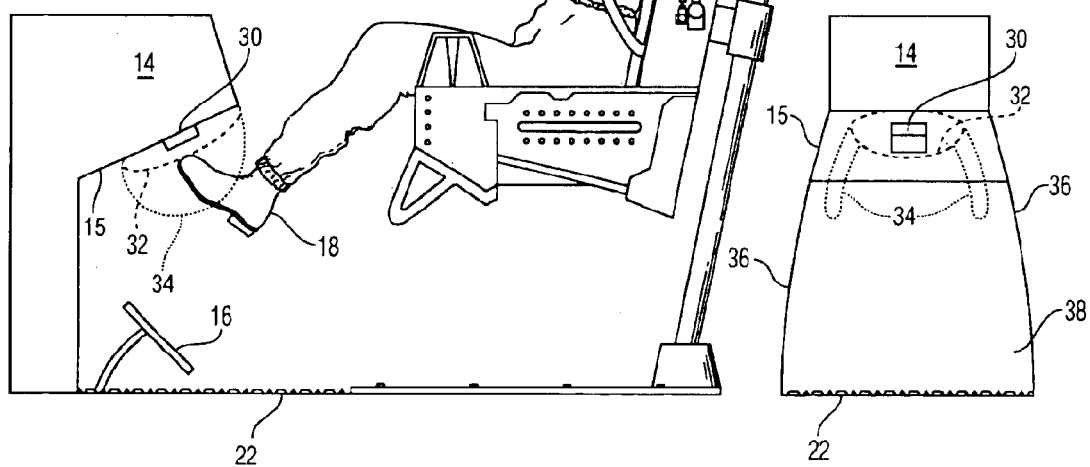
FIG. 4A is a schematic side view of a second embodiment of the invention.
FIG. 4B is a schematic front view of the embodiment of FIG. 4A.

FIG. 4A is a schematic side view of a second embodiment of the invention. FIG. 4B is a schematic front view of the embodiment of FIG. 4A. In FIGS. 4A and 4B, an airbag module 30 is surface mounted below the instrument console 14 on a bottom surface 15 thereof. In FIG. 4B, walls 36, console 14 and floor 22 define a foot well 38. Dashed lines indicate the deployed state of the airbag 32. Airbag 32 is a balloon type airbag, such as the driver and passenger side balloon airbags used in the automotive industry. Airbag module 30 may also include one or more side curtain airbags 34, shown in deployed state by dotted lines. As in the first embodiment, the airbags 32, 34 deploy after receiving a signal from the escape system sequencing system.

The airbags 32, 34 help deflect the feet 18 and legs down and away from the instrument console 14, as well as to cushion any impact. The surface mounted airbags provide greater surface area coverage than the flush mounted airbags. The placement of the surface mounted airbag module 30 could be at any position along the length of the foot well 38. The surface area of the inflated airbags 32, 34 must be sufficient to mitigate any hazard created by the surface mounted airbag module 30.

FIG. 5A is a schematic side view of a third embodiment of the invention. FIG. 5B is a schematic front view of the embodiment of FIG. 5A. In FIGS. 5A and 5B, an airbag module 40 is mounted behind the instrument console 14. Airbag module 40 is mounted on a rear surface 17 of the instrument console 14 and flush with a bottom surface 15 of the console 14. In FIG. 5B, walls 36, console 14 and floor 22 define a foot well 38. Dashed lines indicate the deployed state of the airbag 42. Airbag 42 is a balloon type airbag, such as the driver and passenger side balloon airbags used in the automotive industry. Airbag module 40 may also include one or more side curtain airbags 44, shown in deployed state by dotted lines. As in the first and second embodiments, the airbags 42, 44 deploy after receiving a signal from the escape system sequencing system. The airbags 42, 44 help deflect the feet 18 and legs down and away from the instrument console 14, as well as to cushion any impact.

In the invention, different types of airbag construction technologies can be employed, such as driver steering balloon, passenger balloon and side curtain, all typically used in the automotive industry. The specific size and shape of the airbag is primarily a function of the need to conform to the foot well(s) of the aircraft and the placement of the airbag. The invention may be retrofitted to certain aircraft escape systems. Airbags require no periodic maintenance, other than service life change out.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method for mitigating toe strike in a cockpit of an aircraft, comprising:
   providing an airbag module mounted to a bottom surface of an instrument console located in the cockpit of the aircraft;
   releasing an airbag from the airbag module after an ejection sequence begins; and
   using the airbag to protect a pilot's lower limbs from striking the instrument console as the pilot begins ejecting.

2. The method of claim 1, wherein the airbag module is flush mounted on said bottom surface of the instrument console.

3. The method of claim 2, wherein the airbag is a balloon type airbag.

4. The method of claim 1, wherein the step of releasing an airbag includes releasing a balloon type airbag and at least one side curtain type airbag.

5. The method of claim 1, wherein the airbag module is surface mounted on said bottom surface of the instrument console.

6. The method of claim 5, wherein the airbag is a balloon type airbag.

7. A method for mitigating toe strike in a cockpit of an aircraft comprising:
   providing an airbag module mounted to an instrument console located in the cockpit of the aircraft;
   releasing an airbag from the airbag module after an ejection sequence begins; and
   using the airbag to protect a pilot's lower limbs from striking the instrument console as the pilot begins ejecting,
   wherein the airbag module is mounted on a rear surface of the instrument console and flush with said bottom surface of the instrument console.

8. The method of claim 7, wherein the step of releasing an airbag includes releasing a balloon type airbag and at least one side curtain type airbag.

9. The method according to claim 1, wherein said releasing said airbag in a first direction opposite of a second direction of said pilot after said ejection sequence begins.

10. The method according to claim 7, wherein said releasing said airbag in a substantially downward direction opposite of an upward direction of said pilot after said ejection sequence begins.

11. A method for mitigating toe strike in a cockpit of an aircraft, comprising:
    providing an airbag module mounted to an instrument console located in the cockpit of the aircraft;
    releasing an airbag from the airbag module after an ejection sequence begins; and
    using the airbag to protect a pilot's lower limbs from striking the instrument console as the pilot begins ejecting,
    wherein said cockpit comprises a floor, said releasing said airbag in a direction of said floor.

* * * * *